(12) United States Patent
Volpi

(10) Patent No.: US 8,079,208 B2
(45) Date of Patent: Dec. 20, 2011

(54) HYBRID CORDS FOR TIRE REINFORCEMENT

(75) Inventor: Alessandro Volpi, Milan (IT)

(73) Assignee: E. I. du Pont de Nemours and Company, Wilmington, DE (US)

( * ) Notice: Subject to any disclaimer, the term of this patent is extended or adjusted under 35 U.S.C. 154(b) by 472 days.

(21) Appl. No.: 12/327,952

(22) Filed: Dec. 4, 2008

(65) Prior Publication Data

US 2009/0159171 A1    Jun. 25, 2009

Related U.S. Application Data

(60) Provisional application No. 61/005,310, filed on Dec. 4, 2007.

(51) Int. Cl.
*D02G 3/02* (2006.01)

(52) U.S. Cl. .......................................................... 57/222

(58) Field of Classification Search .................... 57/212, 57/213, 214, 216, 217, 218, 220, 221, 222, 57/223
See application file for complete search history.

(56) References Cited

U.S. PATENT DOCUMENTS

| | | | |
|---|---|---|---|
| 551,498 A | 12/1895 | Landis | |
| 4,034,547 A * | 7/1977 | Loos | ................. 57/211 |
| 4,176,705 A | 12/1979 | Russell et al. | |
| 4,317,000 A * | 2/1982 | Ferer | ............... 174/70 R |
| 4,807,680 A | 2/1989 | Weidenhaupt et al. | |
| 4,878,343 A | 11/1989 | Weidenhaupt et al. | |
| 4,887,422 A * | 12/1989 | Klees et al. | ................ 57/220 |
| 2010/0071826 A1 * | 3/2010 | Yokokura | ..................... 152/527 |

* cited by examiner

*Primary Examiner* — Shaun R Hurley

(57) ABSTRACT

A cord for reinforcing tires having a core of at least one p-aramid filament that has a modulus greater than about 6.5 N/dTex and a sheath of steel strands that are helically wound around the p-aramid filament. The steel strands consist of either a single steel wire or multiple steel wires twisted together.

14 Claims, 3 Drawing Sheets

HYBRID CORDS FOR TIRE REINFORCEMENT

BACKGROUND OF THE INVENTION

1. Field of the Invention

The present invention relates to the field of hybrid cords for reinforcement of tires, in particular hybrid cords comprising steel and p-aramid filaments.

2. Description of the Related Art

It is known to make hybrid cords for reinforcing tires comprising steel strands wound with p-aramid strands, both with a steel core and a p-aramid core.

U.S. Pat. No. 5,551,498 describes hybrid cords having a core of two p-aramid strands twisted together and an outer layer or sheath of six steel strands or filaments surrounding the core. Also described are hybrid cords consisting of a core consisting of three steel strands and a layer consisting of four p-aramid strands surrounding the core.

U.S. Pat. No. 4,176,705 describe wire reinforcement cords for tires. The cords consist of a p-aramid core, and steel strands comprised of steel filaments twisted together are disposed about the core.

It is known that steel wires have a lower breaking extension than filaments of aromatic polyamide (aramid). As a consequence, prior art composite reinforcing cords can be exposed only to loads at which the cord's extension does not exceed the breaking extension of the steel wire strands. If this limit load is exceeded, the steel wires rupture and the entire load is taken up by the aramid core which in turn immediately exceeds its own breaking elongation and ruptures as well. In other words, known composite cords break when the extension corresponds to the breaking extension of its steel wire component, in spite of the fact that the latter is distinctly below the breaking elongation of the polyamide core.

Such premature breakage of the steel wires is described in U.S. Pat. No. 4,807,680, which discloses a tire including a hybrid cord consisting of a core of multiple p-aramid filaments surrounded by steel filaments that are wound around the core. The proposed solution is to use almost rectangular cross-section wires, which have a higher elongation at break than corresponding regular round cross-section wires. Hybrid cords using rectangular cross-section wires, are also described in U.S. Pat. No. 4,878,343.

A need remains for hybrid cords which make full use of the p-aramid component.

DETAILED DESCRIPTION OF THE INVENTION

Definitions

Figure 1:
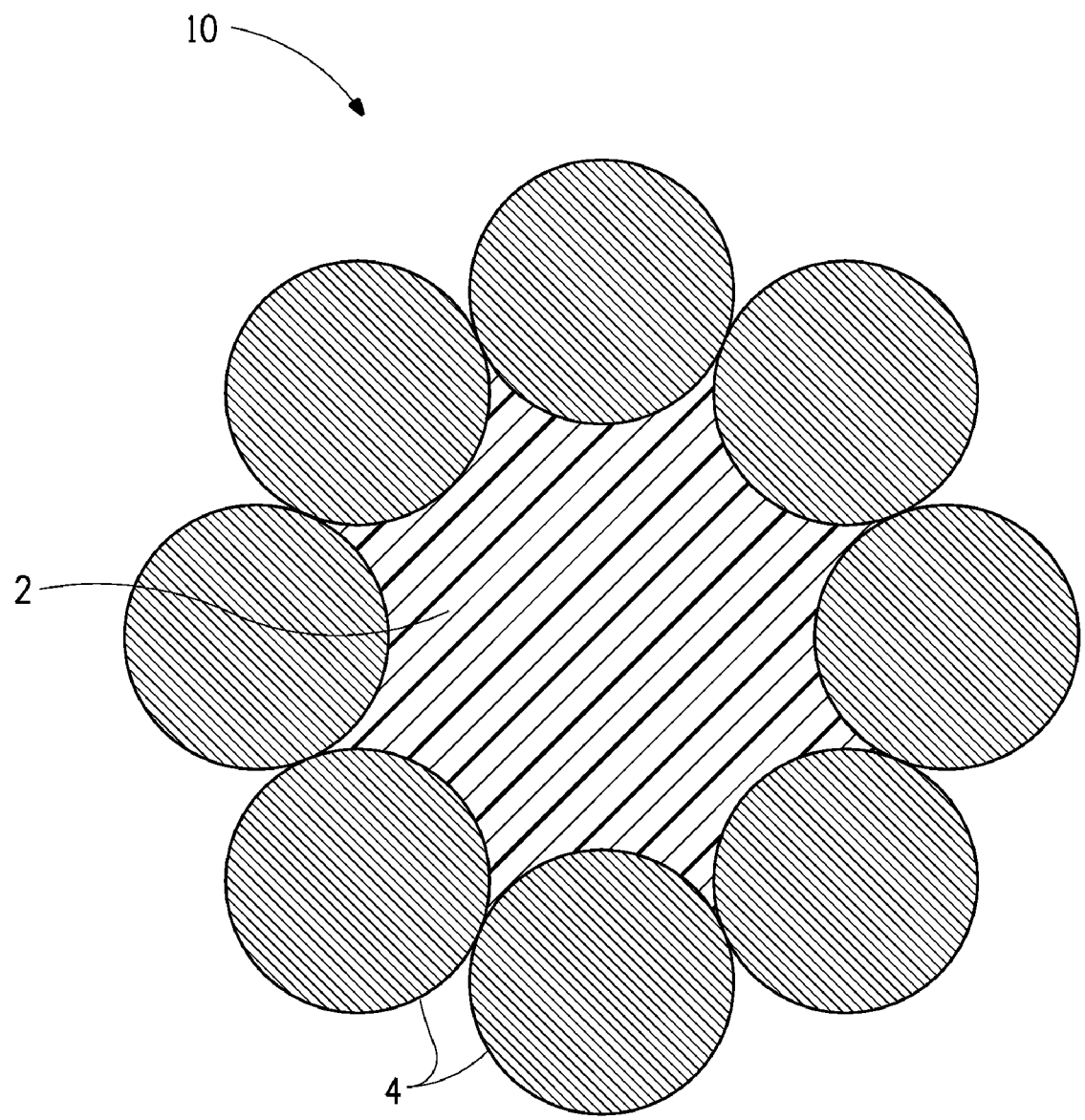
FIG. 1 depicts the cross-section of a hybrid cord in one embodiment of the invention.

"Strand" as used herein means a continuous band of material, either aramid or steel, which band of material may comprise either a single filament or multiple filaments twisted together to form a yarn (aramid) or cable (steel).

"Filament" as used herein means a relatively flexible, macroscopically homogeneous body having a high ratio of length to width across its cross-sectional area perpendicular to its length. The filament cross section can be any shape, but is typically circular. Herein, the term "fiber", with respect to aramid, is used interchangeably with the term "filament". The term "wire", with respect to steel, may also be used interchangeably with the term "filament".

"Wire" as used herein means a continuous body of steel having a high ratio of length to width across its cross-sectional area perpendicular to its length.

"Yarn" as used herein means a strand comprising multiple filaments twisted together.

"Cable" as used herein means a strand comprising multiple wires twisted together.

"Diameter" in reference to a filament, strand, yarn or cable is the diameter of the smallest circle that can be drawn to circumscribe the entire cross-section of the filament, strand, yarn or cable.

"Denier" the weight in grams per 9,000 m length of filament, strand, yarn or cable.

"Tex" the weight in grams of one kilometer of filament, strand, yarn or cable.

"Decitex" one tenth of a Tex, abbreviated as dTex.

"Helical angle" means the angle formed by the path of a sheath strand and the major axis of the core. The expression helix angle is used equivalently.

"Lay length" means the length, measured on the sheath axis, corresponding to a full turn of sheath around the core.

It has been found that when a hybrid cord is made using a core of high modulus p-aramid surrounded by steel strands, best use is made of the p-aramid strength and hybrid cords are produced in which the breaking load value is close to the sum of that of the p-aramid and the steel separately. In a first embodiment, the invention provides a hybrid cord for reinforcing tires, the cord comprising: a core of at least one p-aramid filament; and a sheath of steel strands helically wound around the p-aramid filament; wherein the p-aramid filament has modulus greater than about 6.5 and up to about 10.8 N/dTex.

In a second embodiment, the invention provides a tire reinforcement structure comprising a hybrid cord of the invention.

In a third embodiment, the invention provides a tire comprising a hybrid cord of the invention.

In a one aspect, the invention provides a method for manufacturing a hybrid cord, comprising the steps of providing a core of at least one p-aramid filament having a modulus greater than about 6.5 N/dTex and wrapping the core with a plurality of steel strands, so as to form a sheath.

In another aspect, the invention provides a method for manufacturing a tire reinforcement structure comprising a step of incorporation of a hybrid cord of the invention in a matrix.

In yet another aspect, the invention provides a method for manufacturing a reinforced tire comprising a step of incorporating a hybrid cord of the invention within the tire.

Core

In one embodiment, the hybrid cord of the invention has a core that comprises at least one continuous high-modulus p-aramid filament wherein the modulus is typically between 6.5 and 10.8 N/dTex; for example 7 or greater such as 7 to 10.8 N/dTex; or additionally 6.5 to 8 N/dTex. The high modulus p-aramid can be achieved as described, for example, in U.S. Pat. No. 3,869,430 by fiber spinning through hot chambers, tensile devices and lowering spinning speed to raise the crystallinity and provide the desired crystal orientation.

By using high modulus p-aramid, the elongation at break of the core and the sheath filaments is closely matched, so that under a breaking load (i.e. destructive tensile test), the core and the sheath filaments tend to break at essentially the same elongation or, more simply, at the same time. One or more yarns may be used for the core.

The core may have a round or elliptical cross-section before being wound with the sheath filaments, however, it can also have a more complex shape, such as a multi-lobed shape or a star shape. Once the core is wound with the sheath filaments, it will be "squeezed" by the sheath filaments, and will typically take on a more complex cross-sectional shape, such as the "star shape" in FIG. 1.

The core may consist of a single p-aramid filament, or it may consist of a yarn made by twisting together multiple p-aramid filaments. It is also possible for the core to consist of two or more p-aramid filaments that are not twisted together, i.e. which are in a free relationship, or it may consist of two or more aramid yarns which are either twisted together or free.

Essentially any diameter or linear density yarn may be used for the core. For homogenous yarns, linear density is related directly to diameter and so the two expressions may be used interchangeably. The linear density of the core strand chosen depends on the final diameter of hybrid cord that is desired. An example of a yarn that can be used as the core strand is a p-aramid yarn having a linear density in the range of about 1000-5000 dtex, or about 1500-4000 dtex. Commercially available yarns having linear densities in the range of about 1600-3200 dtex are suitable.

The core yarn may consist of multiple p-aramid filaments that are twisted together to form the yarn of the desired dTex. For example, in a typical yarn having a linear density of about 1580 dTex, there are about 1000 filaments. In a typical yarn having a linear density of about 3160 dTex, there are about 1333 to 2000 filaments.

Sheath

Each sheath strand may consist of a continuous single steel wire or it may consist of multiple continuous wires twisted together to form a cable. The wires have an elliptical or circular cross-section. The wires are typically coated with a coating conferring affinity for rubber, especially a coating which can react with sulphur atoms in the rubber, such as, for example, copper, zinc and alloys of such metals, for example brass.

The diameter of the sheath strands will influence the final structure of the hybrid cord. A typical diameter for steel wires used in the hybrid cord of the invention for tire reinforcement is in the range of about 0.15 mm to 0.25 mm, for example 0.175 mm. Also preferred is so-called "fine steel", which has a diameter in the range of about 0.04 mm to 0.125 mm. Cords made with fine steel sheaths are particularly suited for passenger car tire belts or motorcycle tire belts. If fine steel wires are used as the sheath, it is preferred to use a core of about 1600 dtex. If wires having a diameter of about 0.15 mm or more are used in the sheath, the core should preferably be made with one or two p-aramid yarns with each yarn being of about 3200 dtex.

Hybrid Cords

In providing embodiments of a hybrid cord according to the invention the following parameters are considered:

The number of sheath strands, N;
The diameter of the sheath strands, d;
The diameter or linear density of the core strand or strands;
The filling ratio;
The helical angle θ or the lay length. These two parameters are not independent since the lay length is equal to π*$d_c$/tan θ, where $d_c$ is the diameter of the circle passing through the centers of the sheath strands. The filling ratio is defined as the ratio between the actual cross-sectional area of the core and the area available for the core. In the hybrid cords of the invention, it is desired to have a filling ratio of from about 0.85 to 1.15, but preferably about 1.

For helical angles not exceeding 20°, the approximate total area available for the core ($A_{core}$) is given empirically by equation (1):

$$A_{core} = \left[\frac{d}{(2\cos\theta)}\right]^2 \times \left\{[\pi - N(\beta - \sin\beta\cos\beta)] \times \left(\frac{1}{\tan\beta}\right)^2 - N\cos\theta \times \left(\frac{\pi}{2 - \beta - \sin\beta\cos\beta}\right)\right\} \quad (1)$$

wherein d is the diameter of the sheath strands, θ is the helical angle, N is the number of sheath strands, and β=π/N. The strand diameter d is expressed in mm, and β is expressed in radians, so that the resulting $A_{core}$ value is in mm².

The filling ratio can be calculated by dividing the actual core cross section by the calculated $A_{core}$ value. The actual core cross section can be measured by means of optical or electronic microscopy or, alternatively, can be calculated as:

$A_{actual}$[mm²]=Linear Density[dTex]/(10000*Fiber Specific Gravity*Core Fill Factor)

wherein, in case of p-aramid yarns made with round cross-section fibers, the Fiber Specific Gravity is equal to 1.44 and the Core Fill Factor has been experimentally found to be equal to 0.74768. The Core Fill Factor is the fraction of the effective yarn cross section occupied by the aramid fibers on the total yarn cross section which also includes the small voids existing between the closely packed fibers.

The external sheath may consist of as few as two steel strands, but may have less than twenty steel strands.

The diameters of steel strands are about 0.08 to 0.25 mm or about 0.08 to 0.125 mm for passenger car tire or motorcycle tire belt applications and about 0.15 to 0.2 for truck tire belt and carcass applications.

In conventional hybrid cords, with low-modulus p-aramid as the core and a steel wire sheath (for example as described in U.S. Pat. No. 4,176,705), it is in theory possible to match the breaking load of the sheath and the core, but only by using very high helical angles (i.e. greater than 30°) so as to artificially increase the elongation at break of the steel sheath. However, such high helical angles cannot practically be made by means of the industrially available steel cord cabling equipment. According to the present invention, it is possible to obtain a good match of the load at break of the core and the sheath, while using reasonable helical angles (e.g., in the range of about 8 to 21°). Additionally, the hybrid cords of the invention may have a helical angle in the range of about 10 to 15°.

Some embodiments of hybrid cords of the invention are described below. These cords all have filling ratios of 1.0:

Cord 1
Core: p-aramid yarn, made from p-aramid having a modulus greater than about 6.5 N/dTex, 1580 dtex, 1000 filaments ±2%
Sheath: 15 steel wires having diameter 0.1 mm
Helical angle: 18.6°.
Lay length: 4.74 mm
Expected tensile strength: 609 N Cord 2
Core: p-aramid yarn, made from p-aramid having a modulus greater than about 6.5 N/dTex, 1580 dtex, 1000 filaments ±2%
Sheath: 18 steel wires having diameter 0.08 mm
Helical angle: 20.2°

Lay length: 4.19 mm
Expected tensile strength: 535 N
Cord 3
Core: p-aramid yarn, made from p-aramid having a modulus greater than about 6.5 N/dTex, 1580 dtex, 1000 filaments ±2%
Sheath: 17 steel wires having diameter 0.09 mm
Helical angle: 12.9°
Lay length: 6.92 mm
Expected tensile strength: 596 N
Cord 4
Core: p-aramid yarn, made from p-aramid having a modulus greater than about 6.5 N/dTex, 1580 dtex, 1000 filaments ±2%
Sheath: 13 steel wires having diameter 0.125 mm
Helical angle: 10.9°
Lay length: 8.97 mm
Expected tensile strength: 740 N
Cord 5
Core: p-aramid yarn, made from p-aramid having a modulus greater than about 6.5 N/dTex, 3173 dtex, 1333 to 2000 filaments
Sheath: 13 steel wires having diameter 0.175 mm
Helical angle: 13.0°
Lay length: 10.2 mm
Expected tensile strength: 1454 N
Cord 6
Core: p-aramid yarn, made from p-aramid having a modulus greater than at or about 6.5 N/dTex, 3276 dtex, 1333 to 2000 filaments
Sheath: 15 steel wires having diameter 0.15 mm
Helical angle: 12.8°
Lay length: 10.2 mm
Expected tensile strength: 1347 N
Cord 7
Core: two p-aramid 3155 dtex yarns twisted together, made from p-aramid having a modulus greater than about 6.5 N/dTex, each yarn had 1333 to 2000 filaments
Sheath: 17 steel wires having diameter 0.175 mm
Helical angle: 17.0°
Lay length: 10.2 mm
Expected tensile strength: 2288 N In the cords described above, the "expected tensile strength" has been calculated assuming that the tensile strength of both core and sheath is fully exploited and that the two components break together while the steel sheath is in the plastic flow zone of the elasto-plastic model.

Cords 1, 2, 3 and 4, which have sheaths made of "fine steel", may be used as belt materials for high-performance passenger car tires. Such cords, when embedded in a polymer matrix (e.g. rubber), yield tires having an increased area of the "footprint patch" (i.e. the area of the tire in contact with the road), which leads to an improvement in the behaviour of the belt structure and a reduction of the tangential stresses and strains in the tread elements during high-stress conditions, such as those encountered during so-called "hard-handling" tests on racing tracks. The same cords (i.e. using fine steel) are also suitable for 0° belts in high-performance motorcycle radial tires.

Cords 5, 6 and 7, which use conventional wire diameters in their sheaths, are particularly suited to use in truck tire belts and carcasses.

Tire Reinforcement Structures and Tires

The hybrid cord of the invention is particularly suited for use in reinforcing belts in passenger tires, truck tires and carcasses and high performance motorcycle tires. In comparison to pure steel reinforcement cord, the use of p-aramid as the core material in the cord of the invention reduces weight in the tire and improves rolling resistance. Furthermore, it reduces corrosion, since p-aramid is not susceptible to corrosion.

To incorporate the hybrid cord of the invention into the tires, the cord is incorporated into a matrix to form a tire reinforcement structure, in the form of a carcass, a bead reinforcement chafer (a composite strip for low sidewall reinforcement), or of a belt strip. The matrix can be any polymeric material which can partially or totally embed the cord of the invention and keep multiple cords in a fixed orientation and placement with respect to each other. Typical materials are thermoset materials, such as rubbers; however it is also possible to use thermoplastic materials, such as thermoplastic vulcanisates and copolyetheresters. The tire reinforcement structure is then fitted into the structure of the tire, typically under the tread. For belt reinforcement structures, the belt runs around the circumference of the tire, under the tread, or around the rim(s) of the tire.

Method for Making Hybrid Cords

To make a hybrid cord of the invention, a chosen number of steel strands are cabled or spirally wrapped around the high modulus p-aramid core. The steel strands may each be composed of a desired number of steel filaments or wires, which are twisted together to form a cable. A standard cabling machine for steel cord production can be used to produce the hybrid cord.

It is desirable that the aramid core completely fill the centrally disposed void created by the cabled or spirally wrapped steel strands. The filling ratio may be about 0.85 to 1.15 or about 0.95 to 1.05.

If the filling ratio is too low, it is difficult to get a regular geometry of the hybrid cord, and there will be no mechanical coupling between the core and the sheath. This means that the core can slip inside the sheath, impairing cord strength.

On the other hand, if the filling ratio is too high, the gap between adjacent sheath wires will be too large and the outer surface of the hybrid cord will not be essentially 100% metal, because the aramid core will be exposed. Brass-coated steel reacts with linking agents in the rubber, resulting in adhesion of the rubber matrix to the steel sheath. The same adhesion does not occur with untreated aramid. This means that if the aramid core is exposed, adhesion of the rubber matrix to the cord may be compromised.

The sheath strands may cover at least 85% of the core, or at least 90% of the core, or even at least 95% of the core. With a filling ratio of 1.15, the steel sheath will cover 93.25% of the core surface.

When the hybrid cord 10 has a filling ratio of 1, the geometry of the cross-section is "regular" (see FIG. 1), i.e. the core 2 essentially completely fills the star-shaped gap inside the sheath wires 4. As shown in FIG. 1, the cross-section of the hybrid cord 10 has 8 wires 4 spirally wrapped around the aramid core 2 with each sheath wire 4 disposed with its cross-sectional center on the vertices of a regular polygon. The aramid core is shown as being squeezed into a complex shape (in this depiction, a star) by the sheath filaments.

EXAMPLES

The hybrid cords described below were made and subjected to tests of total load at break according to ASTM D-2969:

Example 1

Core: yarn, made from p-aramid having a modulus greater than r about 6.5 N/dTex), 3160 dtex, 1333 filaments ±2%.
Sheath: 13 steel wires having diameter 0.175 mm
Helical angle: 13.0°
Lay length: 10.2 mm This example cord represents a practical embodiment of Cord 5, mentioned in the general description. Commercially available 3160 dtex yarn was used as the core. The filling ratio was 0.9969. The expected total load at break if the sheath and core are optimally exploited (as calculated) was 1452 N.

Example 2

Core: yarn, made from p-aramid having a modulus greater than about 6.5 N/dTex, 3160 dtex, 1333 filaments ±2%.
Sheath: 15 steel wires having diameter 0.15 mm
Helical angle: 12.8°
Lay length: 10.2 mm This example cord represents a practical embodiment of Cord 6, mentioned in the general description. Commercially available 3160 dTex yarn was used as the core. The filling ratio was 0.9646. The expected total load at break if the sheath and core are optimally exploited (as calculated) was 1324 N.

Example 3

Core: two 3160 dtex yarns twisted together, made from p-aramid having a modulus greater than about 6.5 N/dTex, each yarn had 1333 filaments ±2%.
Sheath: 17 steel wires having diameter 0.175 mm
Helical angle: 17.0°
Lay length: 10.2 mm This example cord represents a practical embodiment of Cord 7, mentioned in the general description. Commercially available 3160 dtex yarn was used as the core. The filling ratio was 1.0016. The expected total load at break if the sheath and core are optimally exploited (as calculated) was 2290 N The cords of Examples 1, 2 and 3 were tested for actual load at break according to ASTM D-2969. The values determined are listed in Table 1, together with the theoretical values calculated based on the sum of the theoretical ultimate loads of core and sheath.

For the core the calculated value was calculated as follows:

$$\text{Ultimate\_load\_core[N]} = \text{Yarn\_Tenacity[N/dTex]} \ast \text{Linear\_density[dTex]}$$

The ultimate load of the sheath was calculated as:

$$\text{Ultimate\_load\_sheath} = \text{Number\_of\_sheath\_wires} \ast \text{Wire\_breaking\_load} \ast \text{Tensile\_@break\_multiplier where the Tensile\_@break\_multiplier is estimated as a function of the helical angle}$$
$$\theta: \text{Tensile\_@break\_multiplier} = (\cos \theta)^{1.5}$$

The breaking load of a wire whose diameter is d [mm] can be experimentally determined or estimated as:

$$\text{Wire\_breaking\_load[N]} = \text{Steel\_tensile\_strength[N/mm}^2] \ast \tfrac{1}{4} \ast \pi \ast (d[mm])^2$$

The values used for the theoretical strength calculations are:
high modulus p-aramid tenacity 0.193 N/dTex–steel tensile strength 2800 N/mm$^2$

TABLE 1

Calculated and actual total strength at break of hybrid cords of the invention

| Cord | Calculated load at break (N) | Actual load at break (ASTM D-2969) (N) |
|---|---|---|
| Example 1 | 1452 | 1442 |
| Example 2 | 1324 | 1333 |
| Example 3 | 2290 | 2151 |

Examples 1, 2 and 3 are examples of hybrid cords according to the invention. All of them show excellent performance in terms of total load at break, and exploit both the core and the sheath. It is apparent that the experimental tensile strength values ("Actual load at break"), resulting from the average of 5 samples, are in good agreement with the theoretical values ("Calculated load at break"). The agreement is 99.31%, 100.68% and 93.93%, for examples 1, 2 and 3, respectively. The fact that the breaking strength of the larger cord (Example 3) falls a bit short of the expectations is believed to be due to the use of a twisted pair core instead of a single yarn.

Figure 2:
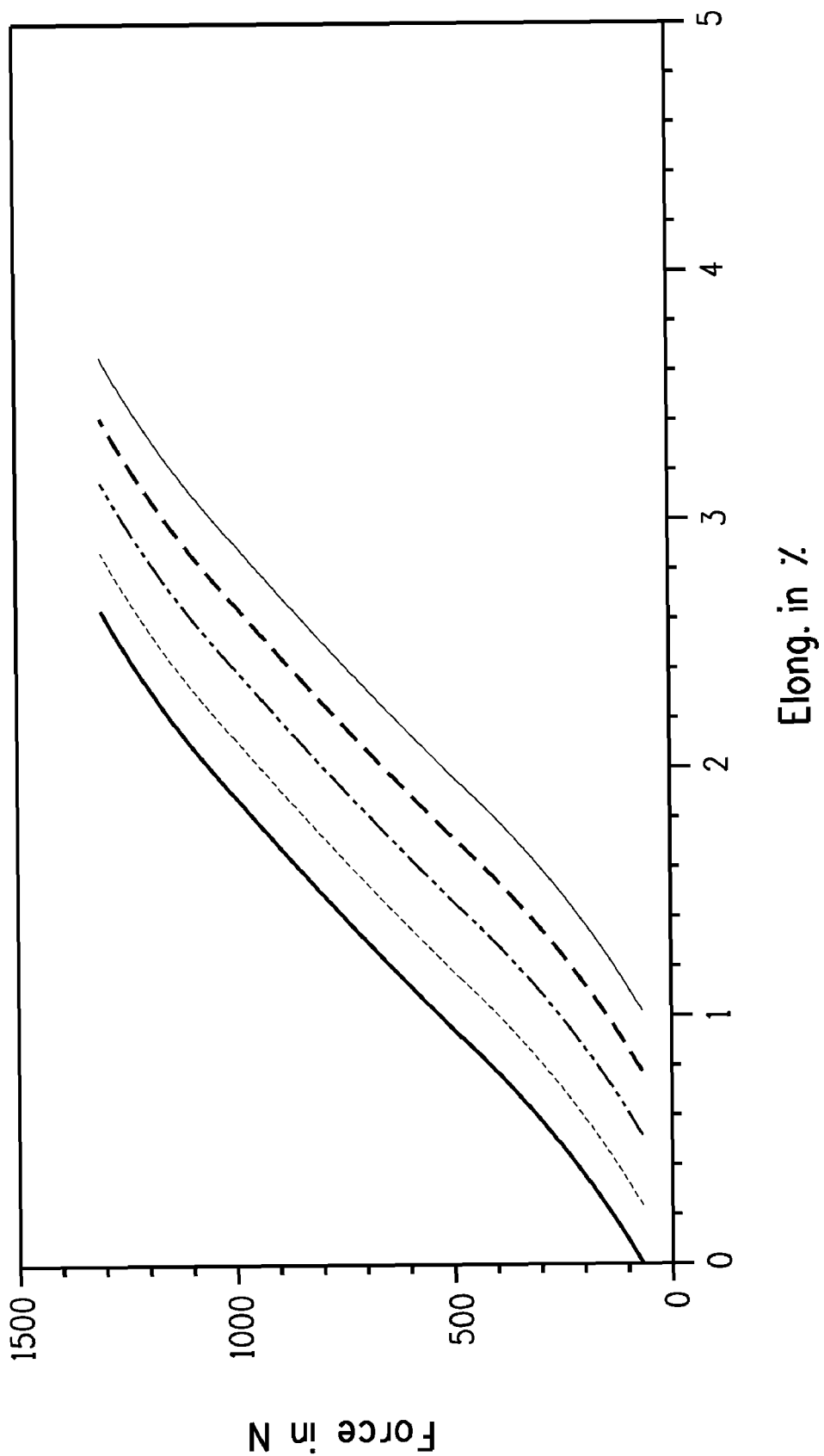
FIG. 2 shows the tensile strength data for Example 2 as one embodiment of the hybrid cord of the invention.

The ideal behaviour of the cords of the invention can be seen in FIG. 2, which shows the tensile strength data for Example 2 (x-axis: Elongation in %, y-axis: Force in N). The smooth curve indicates the desired contemporaneous breaking of the core and sheath.

Figure 3:
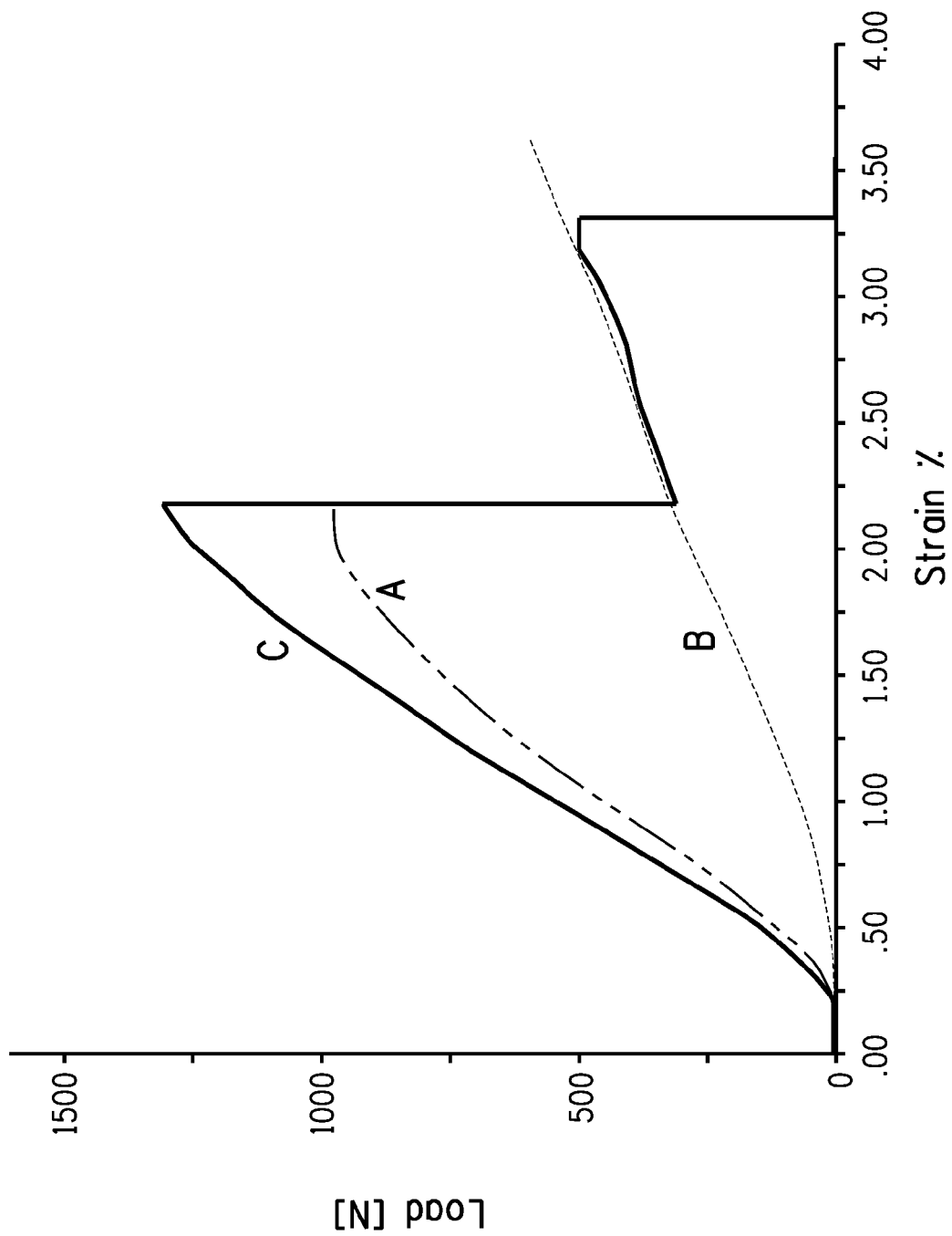
FIG. 3 shows the mechanical behaviour of a conventional cord made with a core of standard p-aramid.

FIG. 3, on the other hand, shows the behaviour of a conventional cord made with standard low modulus p-aramid. On the x-axis is strain in %, on the y-axis is load in N. The cord is a construction comprising a 3333 dTex standard p-aramid core, surrounded by 12 wires of diameter 0.2 mm. Curve C shows the total load on the specimen. Curve B is the tensile plot for the core yarn (i.e. without sheath), and Curve A is the difference between Curve C and Curve B, corresponding to the contribution of the steel sheath. It is apparent that the steel sheath wires break long before the p-aramid core is fully loaded. The calculated strength of the construction is 1592 N, whereas the experimental value is 1298 N (81.54%). The p-aramid core contribution to the strength is only 318 N, corresponding to only 51.88% of the pure core strength. Thus the exploitation of the p-aramid core strength is around 50%, when a standard p-aramid core is used. In contrast, in a hybrid cord of the invention, when a high modulus p-aramid is used; almost 100% of the core strength is exploited.

The invention claimed is:

1. A hybrid cord for reinforcing tires, the cord comprising:
   a core of at least one p-aramid filament and
   a sheath of steel strands helically wound around the p-aramid filament;
   wherein the p-aramid filament has a modulus greater than about 6.5 N/dTex.

2. The hybrid cord of claim 1, wherein the steel strands each consist of a single steel wire.

3. The hybrid cord of claim 1, wherein the steel strands each consist of cables made by twisting together multiple steel wires.

4. The hybrid cord of claim 1, wherein greater than 90% of the outside surface of the core is covered by the sheath.

5. The hybrid cord of claim 1, wherein the helical angle is between about 8 and 21°.

6. The hybrid cord of claim 1, wherein the sheath is made of fine steel wire having a diameter of between about 0.04 mm and 0.125 mm.

7. A support structure for a tire, comprising one or more hybrid cords according to claim 1 and a supporting matrix.

8. The support structure of claim 7, which is a belt.

9. The support structure of claim 7, which is a carcass.

10. The support structure of claim 7, which is a bead reinforcement chafer.

11. A tire comprising one or more hybrid cords according to claim 1.

12. A method for manufacturing a hybrid cord comprising the steps:
 providing a core of at least one p-aramid filament having a modulus greater than about 6.5 N/dTex and
 wrapping the core with a plurality of steel strands, so as to form a sheath of steel strands.

13. A method for manufacturing a support structure for a tire, comprising the step of embedding the hybrid cord of claim 1 in a support matrix.

14. A method for manufacturing a tire, comprising the step of incorporating a support structure according to claim 7 into a tire.

* * * * *